United States Patent [19]

Casalou

[11] Patent Number: 4,470,857
[45] Date of Patent: Sep. 11, 1984

[54] METHOD OF MAKING FOAM PLASTIC ARTICLE

[75] Inventor: Stephen J. Casalou, Ypsilanti, Mich.

[73] Assignee: R. A. Casalou, Inc., Southfield, Mich.

[21] Appl. No.: 392,373

[22] Filed: Jun. 25, 1982

[51] Int. Cl.³ .............................................. A41H 37/00
[52] U.S. Cl. .......................................... 156/66; 5/481;
5/498; 24/306; 156/78; 156/79; 156/242;
156/245; 264/46.4; 428/99; 428/100
[58] Field of Search ....................... 156/66, 91, 77, 78,
156/79, 242, 245; 24/306; 264/45.1, 46.4, 46.7;
428/71, 99, 100; 5/481, 498

[56] References Cited

U.S. PATENT DOCUMENTS

| 3,308,490 | 3/1967 | Cacioppo | 428/100 |
| 4,012,544 | 3/1977 | Richards | 24/306 |
| 4,216,257 | 8/1980 | Schams et al. | 428/99 |
| 4,271,566 | 6/1981 | Pering | 24/306 |
| 4,420,447 | 12/1983 | Nakashima | 264/46.4 |

FOREIGN PATENT DOCUMENTS

| 3031290 | 3/1981 | Fed. Rep. of Germany | 428/99 |
| 3101794 | 12/1981 | Fed. Rep. of Germany | 24/306 |

Primary Examiner—Caleb Weston
Attorney, Agent, or Firm—Cullen, Sloman, Cantor, Grauer, Scott & Rutherford

[57] ABSTRACT

The method of making a foam plastic cushion or structural part with a plurality of fastening assemblies thereon comprising the steps of applying a moisture proof barrier sheet of plastic to a strip of porous backing material; applying a coating of pressure sensitive adhesive to the barrier sheet; applying a strip of hook or loop material having a backing to the adhesive coating extending laterally outward of the strip of backing material, barrier sheet and adhesive coating extending laterally outward of the strip of hook or loop material; bonding the backing of the strip of hook or loop material to the barrier sheet upon the strip of backing material; successively mounting upon a mold surface of a pair of mold bodies defining a mold cavity a plurality of spaced bonded backing and hook or loop assemblies, with the hook or loop material facing the mold surface; adhering peripheral portions of the strip of backing material and adhesive coating to the mold surface for sealing the fastening assemblies thereon; and introducing molten plastic material into the mold bodies filling the cavity forming a molded foam plastic cushion or structural part, the plastic material of the part bonding to the strips of backing material and hook or loop assemblies. An article of manufacture produced by this method.

6 Claims, 6 Drawing Figures

U.S. Patent  Sep. 11, 1984  4,470,857
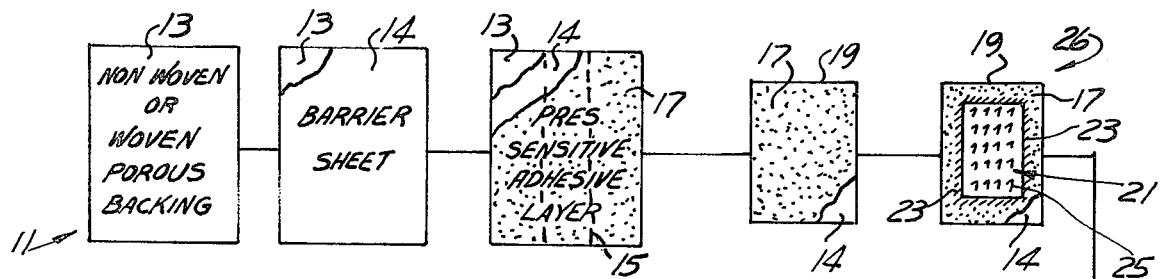
FIG. 1
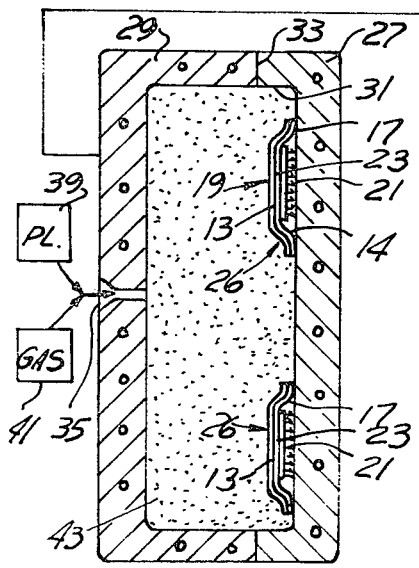
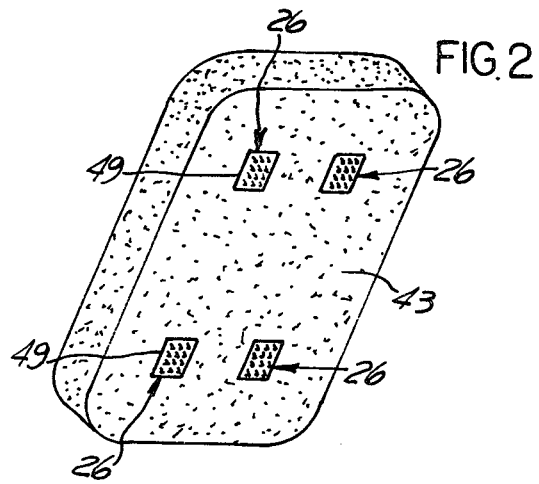
FIG. 2
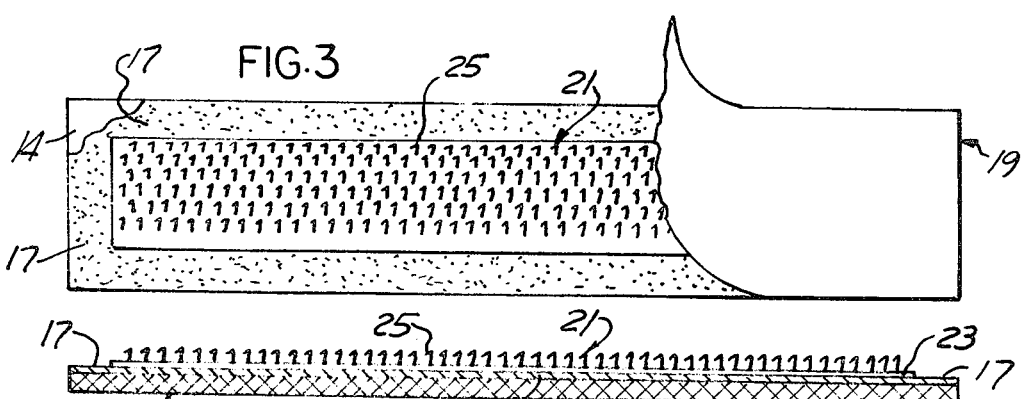
FIG. 3
FIG. 4
FIG. 5
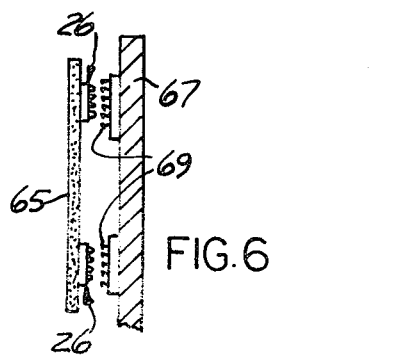
FIG. 6

METHOD OF MAKING FOAM PLASTIC ARTICLE

BACKGROUND OF THE INVENTION

Heretofore, fastening devices hereafter referred to as hook and loop material have been employed for securing a cover such as a seat or backrest cover and in other areas to a molded foam plastic seat cushion or vehicle backrest. The difficulty encountered with use of such hook and loop material is that through use, the hook and loop material becomes separated from the plastic molded cushion or structural part.

Heretofore, molded vehicle door and body panels have been secured to the body or the door of a vehicle using a preformed fastener sometimes referred to as a Christmas Tree fastener, and wherein once the panel has been secured in place, it is extremely difficult to separate the panel from the supporting member such as a car door or to obtain access to the interior thereof.

Various efforts have been heretofore made to provide a means for effectively securing covering materials including plastic or other materials to the outer surface of a molded foam plastic cushion seat or backrest for a vehicle and in other areas.

SUMMARY OF THE INVENTION

An important feature of the present invention is to provide an improved method of making a foam plastic cushion or structural part which have a plurality of fastening assemblies bonded thereon in a substantially permanent manner so as to receive thereover corresponding cooperative fastening assemblies spaced upon the interior of a cover member snugly applied to such molded plastic cushion for defining a vehicle seat or backrest or other products.

An important feature is to provide an improved method of making a foam plastic cushion or structural part which has been molded within a mold cavity defined by a pair of cooperative mold bodies wherein a series of fastener assemblies have been initially applied to the mold surface which include a porous backing material to which has been bonded a sheet of plastic defining a moisture proof film barrier, and overlying said barrier sheet and bonded thereto is a strip of hook or loop material. The fastener assemblies are mounted upon a mold surface within the mold cavity. The successive molding of a plastic article within the cavity causes outer portions of the molded article to be intimately bonded to the backing strips to which have been earlier bonded the hook or loop material. The finished molded article has upon one surface thereof a plurality of hook or loop fastener assemblies mounted thereon.

A further feature of the present invention is to provide a method of making a foam plastic cushion or structural part which includes the steps of applying a coating of pressure sensitive adhesive to the moisture proof barrier sheet and thereafter applying a strip of hook or loop material having a backing to the coating. Peripheral portions of the strip of backing material and barrier sheet and adhesive coating extend laterally outward of the strip of hook and loop material. Thereafter bonding the backing of the strip of hook and loop material to the barrier sheet and successively mounting upon a mold surface of a pair of mold bodies defining a mold cavity a plurality of spaced bonded backing material and hook and loop assemblies wherein the hook and loop material faces the mold surface. Peripheral portions of the strip of backing material barrier sheet and adhesive coating are adhered to the mold surface for sealing the assemblies thereon and for excluding plastic from the hook and loop material. A further step includes introducing molded plastic material into the mold bodies filling the cavity to form a molded foam plastic cushion or structural part wherein the plastic material of the part is bonded to the strips of porous backing material.

In the present method, the strip of porous backing material may be of non-woven plastic, woven plastic or knitted material.

A further feature includes the coating of the pressure sensitive adhesive material onto the moisture proof barrier sheet by rolling, spraying or spreading.

The bonding of the strip of hook or loop material to the barrier sheet may be by adhesive, ultra-sonic welding, dielectric bonding or by sewing, likewise the bonding of the barrier sheet to the strip of backing material.

A further feature of the present method includes in the bonding of the molded plastic article to the strips of backing material wherein portions of the foam plastic material of the molded part migrate and are dispersed within and substantially throughout the porous backing material for an intimate bond thereto.

A further feature is to provide an article of manufacture by the foregoing method in the nature of a molded foam plastic cushion body having upon one surface thereof a plurality of spaced fastener assemblies bonded thereto wherein each fastener assembly includes a porous backing strip. A strip of hook or loop material having a backing is mounted upon and bonded to the backing strip, the other side of the strip of backing material being intimately bonded to the cushion body with portions of the body extending into and dispersed throughout the interior of the strip of backing material.

These and other objects and features will be seen from the following specification and claims in conjunction with the appended drawing.

THE DRAWING

FIG. 1 is a schematic block diagram illustrating the steps of the present process for making a foam plastic cushion or structural foam plastic part.

FIG. 2 is a front perspective view of the molded plastic part with a plurality of fastener assemblies bonded thereto.

FIG. 3 is a plan view on an enlarged scale of the fastener assembly shown in FIG. 2.

FIG. 4 is a side elevational view thereof.

FIG. 5 is a fragmentary side elevational view of a vehicle seat and backrest which includes a molded foam plastic part upon which are bonded a plurality of spaced fastener assemblies adapted for cooperative assembly with corresponding fasteners upon a cover for said seat and backrest.

FIG. 6 is a fragmentary sectioned view of a vehicle door panel as an article of manufacture in accordance with the present method to which have been bonded a plurality of spaced fastener assemblies.

It wll be understood that the above drawing illustrates merely the steps of the present process as well as the article of manufacture produced thereby, and that other steps and articles are contemplated within the scope of the claims hereafter set forth.

DETAILED DESCRIPTION OF AN EMBODIMENT OF THE INVENTION

Referring to the drawing in FIG. 1 there is shown a block diagram 11 illustrative of the steps of the present method. Initially there is provided an elongated sheet 13 of porous backing material which may be made of plastic, non-woven, woven or knitted and for illustration may have initial width of 80 inches.

In the second block of the diagram, the sheet 13 of backing material has secured thereto a plastic moisture proof barrier sheet 14, and thereover is applied a coating or layer 17 of a pressure sensitive adhesive. This coating may be applied by rolling on, by spraying or by spreading thereon using a suitable instrument.

After the adhesive layer 17 has been applied to the barrier sheet 14, sheet 13 is cut along the lines 15 to provide a plurality of strips 19 of backing material and moisture barrier sheets which are cut into suitable lengths or shapes hereafter referred to as a strip of backing material. Said strip of backing material is preferably of a porous non-woven plastic such as polypropylene, but could be made of other plastic material and could be of a knitted or woven construction.

The barrier sheet 14 of FIG. 4, may be of a polyester polyethylene, polypropylene, or the like.

Onto the strip 19 of backing material and moisture proof sheet, on which there is an outer layer of pressure sensitive adhesive 17, there is applied centrally thereof an elongated strip of hook or loop material 21, which in the illustrative embodiment includes a plurality of hooks 25, further shown in FIG. 4.

As a further step the strip of hook or loop material 21 is bonded as at 23 to the barrier sheet 14. Such bonding may include the use of adhesive, ultra-sonic welding, dielectric bonding or sewing.

The result achieved is an assembly of a porous backing strip 19 and a barrier sheet to which has been secured and bonded the strip of hook or loop material 21. Peripheral portions of the strip 19 and the film barrier surrounding the strip of hook or loop material 21 extend outwardly of the strip of hook or loop material.

As a further step and upon the separation of a pair of conventional mold members 27 and 29 which define a mold cavity 31, there are applied to the mold surface of the mold member 27 a plurality of laterally and longitudinally spaced fastener assemblies 26 shown in FIG. 1 in the fifth block of the diagram. Each of these assemblies include an elongated strip 19 of backing material and moisture barrier upon which has been attached a strip of hook or loop material 21 bonded thereto at 23.

These assemblies 26 are applied to the surface 31 of the mold cavity in such fashion that peripheral portions of the strip of backing material 19 outwardly of the strip of hooks or loop material are adhered to said molding surface. This is for the purpose of adhering the fastener assemblies 26 in a spaced apart relationship upon the mold body 27 prior to the molding step.

The peripheral portions of the pressure sensitive adhesive layer 17 upon the barrier sheet 14 effectively secures the fastener assemblies 26 to the mold body 27 throughout 360°. At the same time they are adapted to exclude any plastic material from entering the hook or loop material.

When the mold members 27 and 29 have been brought together and suitably clamped, in the manner well known in the art, with respect to the parting line 33, FIG. 1, a molten plastic material is introduced by injection or otherwise through an opening or sprue 35 within the mold member 29 to form the molded plastic part 43 of any predetermined shape as defined by the mold members.

As is conventional and well known in the art, a suitable foaming agent 41 is employed, such as nitrogen gas which is normally introduced under pressure into the interior of the mold cavity simultaneously with the introduction of the molten plastic 39 into the sprue or other inlet 35 within mold member 29, until the mold cavity has been filled with the foamed plastic material to define the molded article 43.

One illustration of the foam plastic employed is polyurethane though other foamable plastics may be employed for this purpose in order to mold the required molded foam plastic cushion or structural part.

In the molding step, the foam plastic material defining the molded article 43 extends to and bonds with the corresponding plurality of fastener assemblies 26 with portions of the foam plastic material entering into, migrating within and dispersing throughout substantial portions of the strip of backing material 17 upon the side thereof opposite from the side which mounts the strip of hook or loop material. Said foam material extends to the plastic barrier sheet 14.

The result is that the molded article 43 shown in FIG. 2 upon removal from the mold members 27 and 29, when separated, includes a plurality of fastener assemblies 26 bonded thereto as at 49.

While in the illustrative embodiment, FIGS. 1 and 3, the hook or loop material 21 is designated as hooks 25, FIG. 4, the fastener material could be a plurality of loops.

The present invention contemplates the method by which the plurality of fastener assemblies 26 including the strip of hook and loop material are intimately bonded to and form an integral part of the molded article 43, FIG. 2, by the series of method steps illustrated schematically in FIG. 1.

FIG. 5 is merely illustrative of one form of use of the present molded foam plastic cushion or structural part such as the vehicle seat assembly 51 which includes the foam plastic molded seat 53 in the nature of a cushion and a corresponding foam molded plastic backrest 55. In accordance with the present method, the molded articles have upon their outer faces the plurality of spaced fastener assemblies 26.

Seat cover 57, which may be of plastic, fiber or cloth material includes a plurality of hook or loop fasteners 59 suitably secured thereto and juxtaposed in substantial registry with respect to the corresponded fastener assemblies 26 upon the seat and backrest. Fasteners 59 may underlie all the cover 57.

The seat cover 57 anchored as at 63 by a suitable fastener extends over the upper portion of the seat with corresponding hook or loop assemblies 59 in registry with the bonded hook or loop assemblies 26. With the cover drawn tightly over the seat, it is held thereon by the plurality of hook or loop fastener assemblies 59 in cooperative interlocking registry with the corresponding hook or loop assemblies 26 which has been bonded to the molded plastic seat 53. In the case of the backrest cover 61 anchored at 63 said cover overlies and is suitably secured to the molded plastic foam rubber cushion backrest 55 by the plurality of spaced cooperating hook or loop assemblies 59. These may be a full sheet.

FIG. 6 is illustrative of an article of manufacture namely, a molded door panel 65 of the structural foam type 65 which has bonded thereto in accordance with the present method, a plurality of spaced fastener assemblies 26 which are intimately bonded to one surface of the molded panel 65.

The molded panel is removably secured to a portion of the vehicle body such as the door 67, which has thereon a plurality of correspondingly spaced fastener assemblies 69 which include a plurality of hooks or loops adapted for cooprative registry with the molded fastener assemblies 26 on panel 65. Therefore as an improvement over the prior art, the molded panel may be manually separated from the door 67 merely by stripping in the manner well known for the separation of cooperating hooks and loops between a pair of members connected together. Here again, the primary objective is the method by which the fastener assemblies 26 are bonded to the molded panel 65 thus providing a means for conveniently securing the panel to the door or other body part of the vehicle. The present method of making a foam plastic cushion or structural foam plastic part having thereon a plurality of fastener assemblies comprises the following steps:

Bonding or securing a sheet of plastic moisture proof material to a strip 13 of a porous backing material which may be non-woven plastic or a woven plastic or a knitted material. Applying a coating of pressure sensitive adhesive 17 to said plastic sheet. Following cutting of the sheet of backing material into a plurality of narrow strips such as shown at 19, FIG. 1 of a predetermined length and shape, there is applied to said backing strip and barrier sheet 14 a strip of hook or loop material 21 having a backing. Said hook and loop backing engages the adhesive layer.

Peripheral portions of the strip of backing material, barrier sheet 14 and pressure sensitive coating extend laterally outward of the strip of hook or loop material, FIGS. 1 and 3. While the pressure sensitive layer 17 may temporarily adhere the strip of fastener material to the backing 19, a further step includes the bonding of the backing of the strip of hook or loop material to the strip of backing material. This bonding may be achieved by the use of adhesive, by ultra-sonic welding, dielectric bonding or sewing.

As a further step, there is mounted upon the mold surface 31 of a pair of mold members 27, 29 defining a mold cavity, a plurality of spaced bonded backing strip and hook or loop assemblies 26 as shown in FIG. 1 with a hook or loop material facing the mold surface 31 of one of the mold members 27.

The peripheral extending portions of the backing strip film barrier and coating of adhesive outwardly of the strip of fastening material are adhered to the mold surface for sealing the fastener assemblies thereon and for excluding plastic material from the hook or loop material. A final step includes introducing molten plastic material into the mold bodies filling the cavity to form a molded foam plastic cushion or structural foam part wherein the plastic material of the part is intimately bonded to the fastener assemblies and particularly to the strips of porous backing material upon which the hook or loop assemblies have been bonded.

After suitable cooling, the mold members are separated and the molded article is ejected from the mold to provide the article of manufacture shown in FIG. 2.

The molded foam plastic cushion or structural parts may be of any predetermined space or configuration. Likewise the number of and the shape of the fastener assemblies 26 which are bonded thereto may be of any desired shape.

Having described my invention, reference should now be had to the following claims.

I claim:

1. The method of making a foam plastic article with a plurality of fastening assemblies thereon comprising the steps of:
    securing a moisture proof barrier sheet of plastic material to a strip of porous backing material;
    applying a coating of pressure sensitive adhesive to said barrier sheet;
    applying a strip of hook or loop fastener material having a backing to the adhesive coating on said barrier sheet;
    peripheral portions of said strip of backing material, barrier sheet and adhesive coating extending laterally outward of said strip of hook or loop material;
    bonding the backing of said strip of hook or loop material to said barrier sheet;
    successively mounting upon a mold surface of a pair of mold bodies defining a mold cavity a plurality of spaced bonded backing and hook or loop assemblies, with the hook or loop material facing the mold surface;
    and introducing molten plastic material and a foaming agent into said mold bodies filling said cavity and on cooling forming a molded foam plastic article therein, the plastic material of said article bonding to said strips of porous backing material and hook or loop assemblies.

2. In the method of claim 1, the foam plastic material of said molded part migrating and dispersing within and throughout said backing material.

3. In the method of claim 1, said foam plastic article being a vehicle seat.

4. In the method of claim 1, said foam plastic cushion or structural part being a vehicle seat backrest.

5. In the method of claim 1, said foam plastic cushion or structural part being a vehicle door panel.

6. The method of making a foam plastic article with a plurality of fastening assemblies thereon comprising the steps of:
    securing a moisture proof barrier sheet of plastic material to a strip of non-woven plastic backing material;
    applying a coating of pressure sensitive adhesive to said barrier sheet;
    applying a strip of hook or loop fastener material having a backing to the coating on said barrier sheet;
    extending peripheral portions of said strip of backing material, barrier sheet and adhesive coating laterally outward of said strip of hook or loop material;
    bonding the backing of said strip of hook or loop material to said barrier sheet and strip of backing material;
    successively mounting upon a mold surface of a pair of mold bodies defining a mold cavity a plurality of spaced bonded backing and hook or loop assemblies, with the hook or loop material facing the mold surface;
    adhering peripheral portions of said strip of backing material, barrier sheet and adhesive coating to the mold surface for sealing said assemblies thereon and excluding plastic material from said hook or loop material;
    and introducing molten plastic material and a foaming agent into said mold bodies filling said cavity and on cooling forming a molded plastic article therein, the plastic material of said article bonding to said strips of backing material and hook or loop assemblies.

* * * * *